(12) United States Patent
Spronck

(10) Patent No.: US 8,233,220 B2
(45) Date of Patent: Jul. 31, 2012

(54) POLARIZATION NULLING INTERFEROMETRY

(75) Inventor: Julien Felix Paul Spronck, Delft (NL)

(73) Assignee: Nederlandse Organisatie Voor Toegepast-natuurwetenschappelijk Onderzoek TNO, Delft (NL)

( * ) Notice: Subject to any disclaimer, the term of this patent is extended or adjusted under 35 U.S.C. 154(b) by 280 days.

(21) Appl. No.: 12/293,751

(22) PCT Filed: Mar. 26, 2007

(86) PCT No.: PCT/NL2007/050128
§ 371 (c)(1),
(2), (4) Date: Jun. 9, 2009

(87) PCT Pub. No.: WO2007/111508
PCT Pub. Date: Oct. 4, 2007

(65) Prior Publication Data
US 2010/0079852 A1    Apr. 1, 2010

(30) Foreign Application Priority Data
Mar. 24, 2006 (EP) ..................................... 06075694

(51) Int. Cl.
     *G02B 27/10* (2006.01)
     *G02B 5/30* (2006.01)
     *G02B 27/00* (2006.01)

(52) U.S. Cl. .............. 359/618; 359/489.01; 359/489.07; 359/577; 359/900

(58) Field of Classification Search .................. 359/618, 359/301, 303, 483.01, 489.01, 489.07, 577, 359/583
See application file for complete search history.

(56) References Cited

U.S. PATENT DOCUMENTS
6,882,427 B1    4/2005   Kendrick et al.

OTHER PUBLICATIONS

D. Mawet et al.: "Birefringent Achromatic Phase Shifters for Nulling Interferometry and Phase Coronography" Proceedings of Towards Other Earths: Darwin/Tpf and the Search for Extrasolar Terrestrial Planets, Apr. 25, 2003, XP009070237 Heidelberg, Germany cited in the application the whole document.
Spronck J et al: "Chromatism Compensation in Wide-Band Nulling Interferometry for Exoplanet Detection" Applied Optics, Osa, Optical Society of America, Washington, DC, US, vol. 45, No. 4, Feb. 1, 2006, pp. 597-604, XP001239147 ISSN: 0003-6935 cited in the application the whole document.
International Search Report and Written Opinion for PCT/NL2007/050128 dated Jul. 16, 2007.

*Primary Examiner* — Jack Dinh
(74) *Attorney, Agent, or Firm* — Leydig, Voit & Mayer, Ltd.

(57) ABSTRACT

The invention relates to an optical system for providing on-axis destructive interference of light received from an object along a predetermined system optical axis. The system comprises a receiving and guiding optical structure and a combining optical structure. The receiving and guiding optical structure is for receiving and guiding at least three beams of light received from said object, the receiving and guiding optical structure arranged to provide a relative optical path difference between the at least three beams; the combining optical structure is for combining the at least three beams. According to the invention, a polarization varying optical structure is arranged between the receiving and guiding optical structure and the combining optical structure, for varying a polarization state of the beams relative to each other in order to provide on-axis destructive interference.

19 Claims, 7 Drawing Sheets

POLARIZATION NULLING INTERFEROMETRY

FIELD OF THE INVENTION

The invention relates to a method and an optical system for providing on-axis destructive interference of light received from an object along a predetermined system optical axis. In particular, the invention relates to an optical system for providing on-axis destructive interference of light received from an object along a predetermined system optical axis, comprising a receiving and guiding optical structure for receiving and guiding at least three beams of light received from said object, the receiving and guiding optical structure arranged to provide a relative optical path difference between the at least three beams; and a combining optical structure for combining the at least three beams for providing on-axis destructive interference.

BACKGROUND

The first exoplanet has been discovered in 1995 by Mayor and Queloz. Since that moment, more than one hundred and fifty planets have been detected within ten years. All of these planets were found by indirect methods, which means that only some effects were detected that the planet has on its star and not direct radiation from the planet.

Direct detection of an Earth-like exoplanets is not an easy task. Indeed, if our solar system was seen from a distance of 10 pc, the angular separation between Earth and Sun would be equal to 0.5 mrad and the brightness contrast between the star and the planet would be, in the best case, $10^6$.

Nulling interferometry seems a quite promising technique up to now. It consists in observing a star-planet system with an array of telescopes, and then combining the light from these telescopes in such a way that, simultaneously, destructive interference occurs for the star light and (partially) constructive interference for the planet light. The ratio between the intensities corresponding to constructive and destructive interference is called the rejection ratio. To be able to detect a planet, this ratio is preferably of the order of at least $10^6$.

Another major difficulty is that this rejection ratio is preferably achieved in a wide spectral band (6-18 mm or even wider). This wide band is required to obtain spectral information from the planet and to optimally exploit the photon flux from the planet.

To reach this high rejection ratio in a wide spectral band, most current nulling interferometers use a (achromatic) phase shifter.

However, the phase shifter embodiments are problematic since for more than two beams they typically result in asymmetric setups where multiple incoming beams are retarded in different ways so as to shift the phases thereof. These setups are generally difficult to handle.

SUMMARY OF THE INVENTION

The invention has as one of its objects to provide a new type of nulling interferometers which provide an alternative to the prior art systems, in particular, to provide a new type of nulling interferometer wherein these asymmetries can be eliminated. To this end, the invention provides the optical system according to the preamble, and further comprising the features of claim 1. In particular, according to the invention the optical system comprises a polarization varying optical structure arranged between the receiving and guiding optical structure and the combining optical structure, and constructed for varying a polarization state of the beams relative to each other to have a mutually different polarization state, in order to provide on-axis destructive interference.

Using the inventive concept, instead of phase shifting, the polarization states of the phase of the received light beams are varied to provide nulling of multiple beams. Where for a two beam arrangement, this may amount to the same practical application; for three or more beams, this concept is of an entirely different nature and amounts to varying the relative orientations of the polarization vectors; in stead of varying the relative phases of the multiple beams.

BRIEF DESCRIPTION OF THE DRAWINGS

The invention will be further described with reference to the drawings.

In the drawings.

DETAILED DESCRIPTION OF THE DRAWINGS

Figure 1:
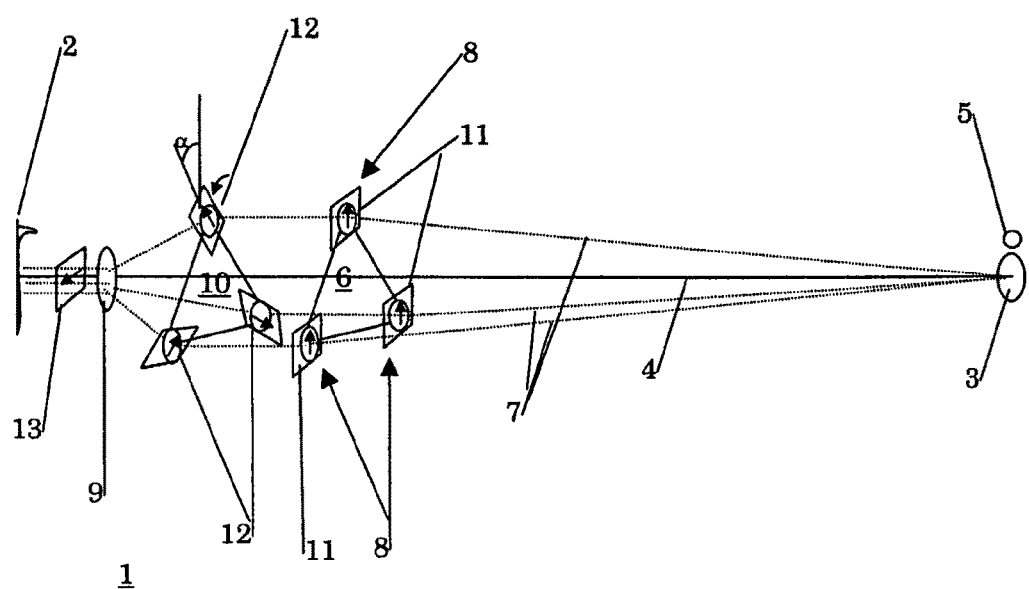
FIG. 1 shows a schematic illustration of a three beam optical setup according to the invention.

Referring to FIG. 1 a schematic illustration is provided as an optical setup according to the invention. In particular, FIG. 1 illustrates an optical system 1 for providing on-axis destructive interference 2 of light received from an object 3 along a predetermined system optical axis 4. In particular, the object 3 here depicted is a star, having a possible exoplanet 5 orbiting around it. The system comprises a receiving and guiding optical structure 6 is for receiving and guiding at least three beams 7 of light received from said object 3.

The receiving and guiding optical structure 6 typically comprises three spaced apart telescopes 8, arranged preferably in a single plane orthogonal to the optic axis (although this is not necessary since relative optical path variations can be compensated for). In this way the receiving and guiding optical structure 6 is arranged to provide a relative optical path difference between the at least three beams 7 as is also further illustrated with reference to FIG. 5.

Although in this description, for illustrative purposes, a three beam optical system 1 is discussed, it should be clear that the principles of the invention can be applied to more than three beam setups, in particular, four and five beam setups or even higher numbers of telescopes combined.

In addition, the optical system comprises optical structures 9 for combining the light of the telescopes 8 to provide on-axis destructive interference. By providing on-axis destructive interference, the on-axis light of the star object 3 is filtered away from the received light beam, so that light from objects around the star 3, in particular, a possible planet 5 can be detected. Prior to combining the light beams 7 a polarization varying optical structure 10 is arranged between the receiving and guiding optical structure 6 and the combining optical structure 9, for varying a polarization state of the beams relative to each other in order to provide on-axis destructive interference. In particular, in the illustrative embodiment depicted in FIG. 1, the polarization varying optical structure 10 is arranged optically symmetrically with respect each of the received light beam, that is, preferably, that the polarization varying optical structure 10 comprises, for each received light beam, identical polarization variation elements 12. Although asymmetric embodiments can also be used, such asymmetries should be corrected which amounts to complications which are not present in this preferred system setup.

Furthermore, schematically is illustrated that only a polarization-filtered fraction is used of the light, using linear polarization filters 11 to provide linearly polarized light. The invention can be carried out conveniently for linearly polarized light, however, the invention is also applicable with other kinds of polarization states, such as elliptical polarization etc, as long as the summed polarization states amount to cancelling. In the embodiment of FIG. 1 the linear polarizers 11 provide a predetermined polarization to the beams 7 prior to varying the polarization state of the beams 7 in the polarization varying optical structure 10. To use the whole intensity of the received light which is typically very low, advantageously, the other (polarized) fraction of the received light is also used by a polarizing beam splitter configuration (not shown).

Discussing in more detail the polarization varying optical structure 10 this structure 10 (in the FIG. 1 conveniently shown as interconnected to illustrate the effective action thereon on each of the received light beam but in practice this is not necessary) comprises, for each received light beam, a waveplate 12 for varying, in particular, rotating the polarization state of the received light beam 7. As an example, alternatively, a pupil rotator, known in the art, can be used for the purpose.

To rotate the polarization state of the received light beam 7, the wave plate 12 (typically a birefringent crystal having an optical axis) is arranged having it's optical axis transverse to a propagation direction of the light beam 7. In addition, to provide a nulling effect, each of the respective waveplates 12 is arranged having a predetermined angle relative to each other, in the drawing schematically illustrated as angle α. For the three beam embodiment using linearly polarized beams, as will be further illustrated with reference to FIG. 6, the angles between the optical axes are preferably equal.

To obtain polarization nulling interferometry in a broad optical range, which is especially needed in spectral analysis of the light coming from the exoplanet 5 the waveplate 12 is preferably an achromatic waveplate. However, as will be shown with reference to FIG. 7, already for a zero order (chromatic) waveplate, obtaining a spectral bandwidth of 3 times a target wavelength is possible while maintaining an acceptable transmission intensity of 0.5.

Furthermore, preferably, the waveplates 12 are preferably rotatable relative to the optical axis 4. In this way the polarization varying optical structure 10 is modulated and, in combination with a post-polarizing filter structure 13, a relative weight of each of the three beams 7 can be varied to provide weighted combination of the at least three beams having a varied polarization state. This is further explained with reference to FIG. 6.

Figure 5:
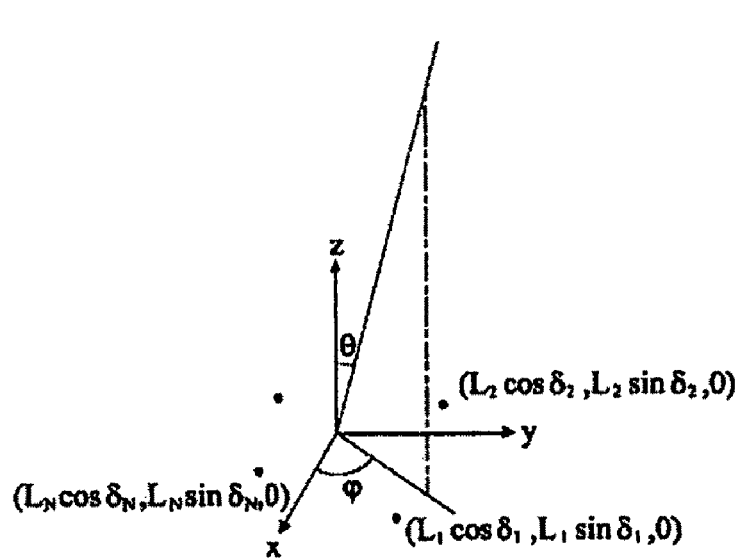
FIG. 5 shows a schematic illustration of an array of telescopes (dots) situated in the plane z=0 and looking in the z-direction.

Consider an array of N telescopes (see. FIG. 5) receiving and guiding light beams having independent phases and amplitudes $\phi_j$ and $A_j$ to each beam before recombination. To cancel the light from the star, on-axis destructive interference is needed. The condition to have this destructive interference (nulling condition) is given by $$f_\varphi(0) = \sum_{j=1}^{N} A_j \exp(i\phi_j) = 0. \quad \text{(Equation 1)}$$

While dividing both members of this equation by the factor $A_1 \exp(i\phi_1)$, in such a way that the amplitudes $A_j$ and the phases $\phi_j$ are defined relatively to the amplitude and phase of the first beam. Note that it is assumed here that the relative amplitudes $A_j$ are not wavelength-dependent but no assumption was made about the absolute spectra of the beams. Note also that these relative amplitudes $A_j$ and phases $\phi_j$ could be wavelength-dependent. A more general condition can be derived assuming independent states of polarization for each beam. Using Jones formalism to describe the polarization the generalized condition is then given by $$\vec{f}_\varphi(0) = \sum_{j=1}^{N} \vec{A}_j \exp(i\phi_j) \quad \text{(Equation 2)}$$

$$= \sum_{j=1}^{N} \begin{pmatrix} A_x \\ A_y \end{pmatrix} \exp(i\phi_j)$$

$$= \begin{pmatrix} 0 \\ 0 \end{pmatrix}.$$

For a two-beam nulling interferometer, the generalized nulling condition in Eq. (2) simply amounts to $$\vec{A}_1 \exp(i\phi_1) = -\vec{A}_2 \exp(i\phi_2) \quad \text{(Equation 3)}$$

In most current nulling interferometers, this condition is satisfied by applying a π-phase shift between the two beams ($\phi_2 = \phi_1 + \pi$). The condition in (Equation 3) could also be fulfilled without any phase shift but considering a polarization rotation of π ($\vec{A}_1 = -\vec{A}_2$). This is a fundamentally different approach, as it will appear more clearly in the example for a Three-beam nulling interferometer. In this case, the following nulling condition is satisfied:

$$\vec{A}_1 \exp(i\phi_1) + \vec{A}_2 \exp(i\phi_2) + \vec{A}_3 \exp(i\phi_3) = 0 \quad \text{(Equation 4)}$$

If all the beams have the same phase, one has $$\vec{A}_1 + \vec{A}_2 + \vec{A}_3 = 0 \quad \text{, (Equation 5)}$$

This condition can be fulfilled by rotating the polarization of the beams. For example, if a horizontal linear state of polarization is imposed on the first beam, the condition in (Equation 5) is satisfied using $$\phi_1 = \phi_2 = \phi_3, \quad \text{(Equation 6)}$$

$$\vec{A}_1 = A_0 \begin{pmatrix} \cos 0 \\ \sin 0 \end{pmatrix},$$

$$\vec{A}_2 = A_0 \begin{pmatrix} \cos \frac{2\pi}{3} \\ \sin \frac{2\pi}{3} \end{pmatrix},$$

$$\vec{A}_3 = A_0 \begin{pmatrix} \cos \frac{4\pi}{3} \\ \sin \frac{4\pi}{3} \end{pmatrix}$$

This shows that the nulling condition can be satisfied without any phase shifter, by only rotating the polarization. The light coming from an on-axis star is then canceled.

If a planet is orbiting around that star, then the planetary light coming from the different telescopes will have different optical path lengths. For that reason, it is interesting to look at the detected intensity as a function of the optical path differences between the three beams. First consider a monochromatic case. The detected amplitude as a function of the optical path differences is given, within a phase factor, by $$\vec{A}_{tot} = \vec{A}_1 + \vec{A}_2 \exp\left(i\frac{2\pi}{\lambda}OPD_{21}\right) + \vec{A}_3 \exp\left(i\frac{2\pi}{\lambda}OPD_{31}\right) = 0$$ (Equation 7)

where $OPD_{21}$ and $OPD_{31}$ are respectively the optical path differences between the beams 2 and 1 and between the beams 3 and 1. The detected intensity is then given by the square modulus of the amplitude in (Equation 7).

Figure 2:
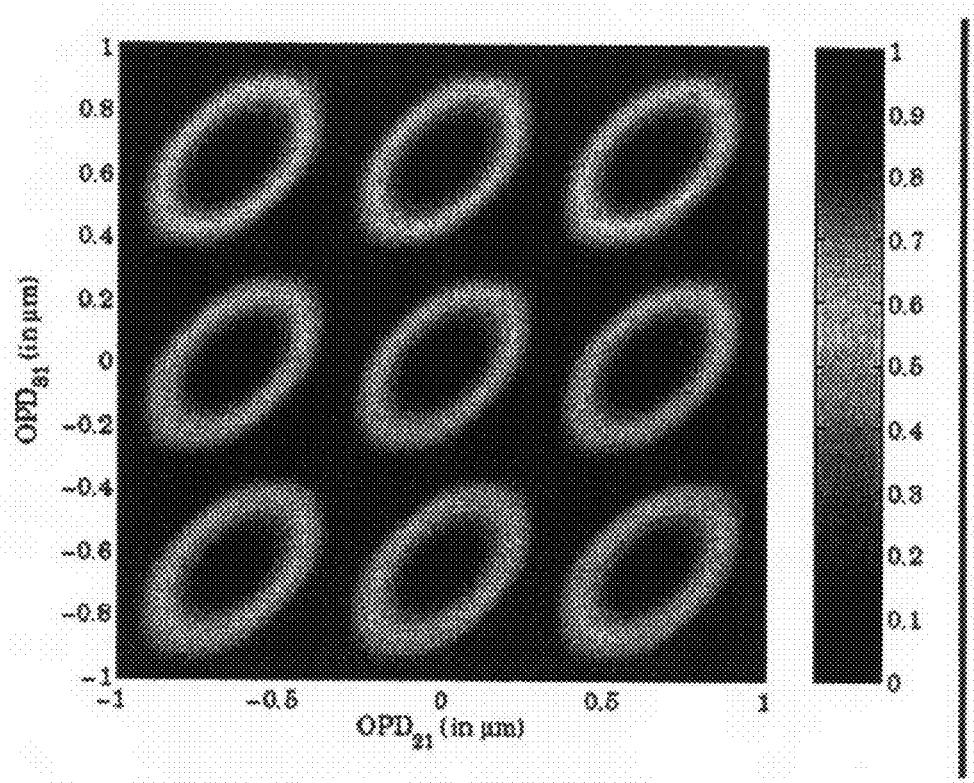
FIG. 2 shows a normalized detected intensity as a function of the optical path differences between the three beams.

In the case of the example of (Equation 6) the detected intensity is depicted in FIG. 2. The rejection ratio, defined as the ratio between the maximal and minimal intensities of the interference pattern, is theoretically infinite.

It is usually thought that beams with different coherent states of polarization cannot interfere with a high contrast. However, this example shows that three differently polarized coherent beams can be made to interfere with a theoretically perfect contrast. This is also true for N beams provided that N>2. The second consequence is that, since the intensity depends on the optical path differences, it should be possible to have a constructive interference for the light coming from the planet: The important fact is that the destructive interference takes place at the zero-OPD position. In that case, there is no wavelength-dependent phase difference between the beams.

A possible implementation to reach the amplitudes in (Equation 6) for every wavelength in the spectral band uses achromatic polarization rotators such as is disclosed in P. Hariharan, "Achromatic and apochromatic halfwave and quarterwave retarders," Optical Engineering, 35 (11), 3335-3337 (1996) and/or D. Mawet, J. Baudrand, C. Lenaerts, V. Moreau, P. Riaud, D. Rouan and J. Surdej "Birefringent achromatic phase shifters for nulling interferometry and phase coronography," Proceedings of Towards Other Earths: DARWIN/TPF and the Search for Extrasolar Terrestrial Planets, Heidelberg, Germany, 22-25 Apr. 2003.

Figure 3:
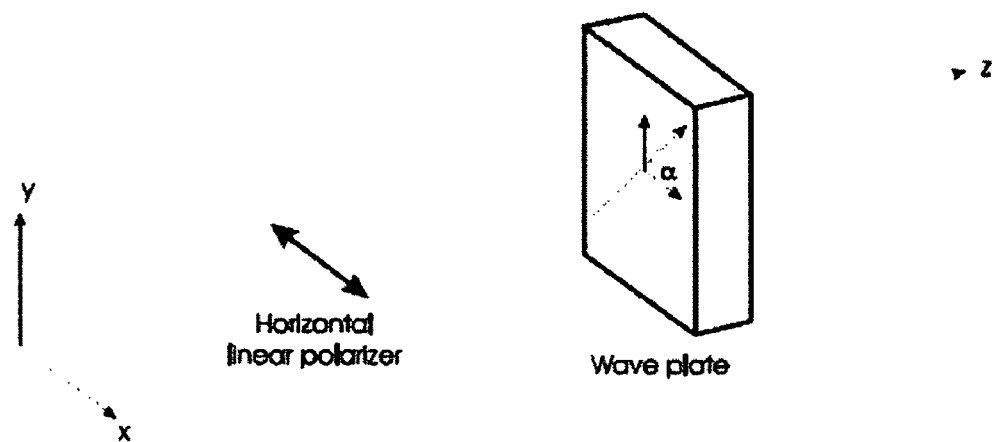
FIG. 3 shows a schematic illustration of a wave plate arrangement according to the invention.

Next, another implementation is discussed. Suppose a system of N beams, initially horizontally linearly polarized. Each polarization is then changed using a simple waveplate whose principal axis makes an angle with the horizontal (see FIG. 3). If $T_r$ and $T_\alpha$ are the complex transmission coefficients of the waveplate in its principal directions ($Tr=|Tr|$ and $T\alpha=|T\alpha|\exp(i\phi_{o-e})$, where $\phi_{o-e}$ is the phase difference between the ordinary and extraordinary axes), the polarization state after the waveplate is given by $$\vec{A} = R_\alpha^{-1}\begin{pmatrix} T_r & 0 \\ 0 & T_\alpha \end{pmatrix} R_\alpha \begin{pmatrix} 1 \\ 0 \end{pmatrix} = \begin{pmatrix} T_r\cos^2\alpha + T_\alpha\sin^2\alpha \\ \frac{1}{2}(T_r - T_\alpha)\sin 2\alpha \end{pmatrix}$$ (Equation 8)

where $R_\alpha$ is a rotation matrix over angle $\alpha$.

For on-axis destructive interference without any phase difference between the beams, while, in a preferable embodiment, having all the waveplates exactly the same but with different orientations of the optical axis thereof, the following relation is satisfied:

$$\sum_j A_j \begin{pmatrix} T_r\cos^2\alpha_j + T_\alpha\sin^2\alpha_j \\ \frac{1}{2}(T_r - T_\alpha)\sin 2\alpha_j \end{pmatrix} = 0$$ (Equation 9)

Since in this embodiment a simple waveplate is used having a wide spectral band, Tr and Ta may be wavelength-dependent in such a way that the first component of the vector in (Equation 9) cannot be equal to zero for every wavelength. The second component, on the other hand, can be canceled achromatically by a good choice of the amplitudes $A_j$ and of the angles $\alpha_j$. If for each beam, a perfect vertical linear polarizer after the wave plate is added; the amplitude of the jth beam is then given by $$\vec{A}_j = A_j \begin{pmatrix} 0 \\ \frac{1}{2}(T_r - T_\alpha)\sin 2\alpha_j \end{pmatrix}$$ (Equation 10)

and the nulling condition then simply amounts to $$\sum_j A_j \sin 2\alpha_j = 0$$ (Equation 11)

Figure 4:
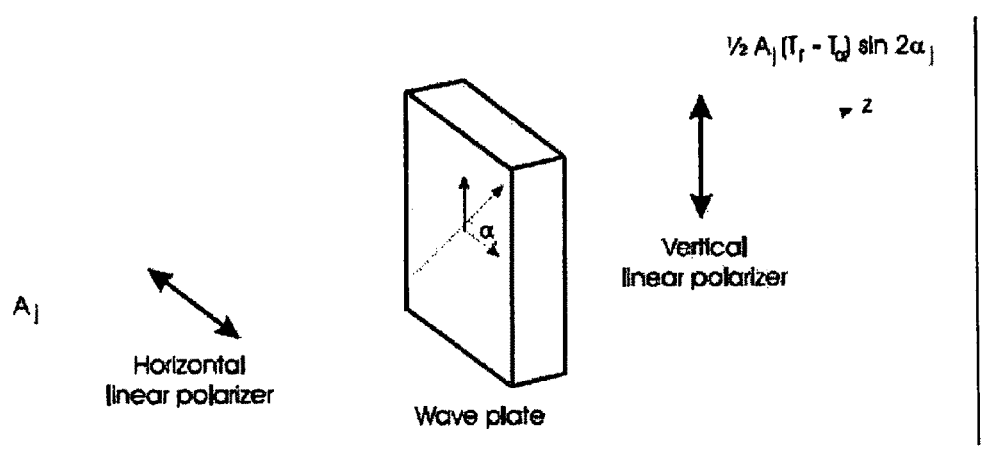
FIG. 4 shows a further modification of the wave plate arrangement according to FIG. 3.

In this proposed exemplary type of nulling interferometers, each beam encounters a horizontal linear polarizer, a waveplate and a vertical linear polarizer (see FIG. 4). It should then be possible to reach a high rejection ratio in a wide spectral band with simple commercially available components. For example, in the case of a three-beam nulling interferometer, an achromatic null can be provided by choosing A1=A2=A3, a1=π/4, a2=7π/12 and a3=11π/12. Note that similar results can be obtained if the beams were initially vertically linearly polarized. Then a polarizing beam splitter can be used instead of the first linear polarizer and apply the same principle to both outputs of the beam splitter in order to use the whole incoming intensity.

Consider N coplanar telescopes looking in the same direction z (see FIG. 5). The position of the $j^{th}$ telescope is given in polar coordinates by ($L_j$, $\delta_j$). The light coming from a point source located at an angular separation from the optical axis θ and at an azimuth angle φ and collected by a certain telescope will have a certain path length, which depends on the position of the point source in the sky and the position of the telescope. Since each telescope has a different position, each beam will have a different optical path length $OPL_j$ and therefore a different phase $\phi_j$.

$$OPL_j = L_j\theta\cos(\varphi - \delta_j)$$ (Equation 12)

and $$\varphi_j = \frac{2\pi}{\lambda}OPL_j = \frac{2\pi}{\lambda}L_j\theta\cos(\varphi - \delta_j)$$

The detected complex amplitude of the electric field after combination is simply given by the sum of the complex amplitudes of the different beams. For independent phases $\phi_j$ and amplitudes $A_j$ before recombination, the detected complex amplitude is given by $$f_\varphi(\theta) = \sum_{j=1}^{N} A_j \exp(i\phi_j) \exp\left(i\frac{2\pi}{\lambda}L_j\theta\cos(\varphi - \delta_j)\right), \quad \text{(Equation 13)}$$

In nulling interferometry, in order to detect a faint planet orbiting a bright star, the light coming from the N telescopes is preferably combined in such a way that on-axis ($\theta=0$) destructive interference is obtained. The condition to get a destructive interference for $\theta=0$ (nulling condition) is then given by $$f_\varphi(0) = \sum_{j=1}^{N} A_j \exp(i\phi_j) = 0. \quad \text{(Equation 14)}$$

The electric field is a vector and it can be decomposed, using Jones formalism, into two components (the two orthogonal states of polarization). To take into account polarization, vectorial instead of scalar quantities are to be considered and then replace in the previous equations the amplitudes $A_j$ by the vector $\vec{A}_j$. The nulling condition would then be $$\vec{f}_\varphi(0) = \sum_{j=1}^{N} \vec{A}_j \exp(i\phi_j) \quad \text{(Equation 15)}$$

$$= \sum_{j=1}^{N} \begin{pmatrix} A_x \\ A_y \end{pmatrix} \exp(i\phi_j)$$

$$= \begin{pmatrix} 0 \\ 0 \end{pmatrix},$$

where $A_x$ and $A_y$ are complex numbers representing the polarization state.

For a point source located at an angular separation from the optical axis q and at an azimuth angle j, the detected complex amplitude $\vec{f}_\varphi(\theta)$ is given by $$\vec{f}_\varphi(\theta) = \sum_{j=1}^{N} \vec{A}_j \exp\left(i\frac{2\pi}{\lambda}L_j\theta\cos(\varphi - \delta_j)\right) \quad \text{(Equation 16)}$$

$$= \sum_{j=1}^{N} \begin{pmatrix} \theta \\ \frac{1}{2}(T_r - T_a)\sin 2\alpha_j \end{pmatrix} \exp\left(i\frac{2\pi}{\lambda}L_j\theta\cos(\varphi - \delta_j)\right)$$

Note that this expression is not general in the sense that the star to be analyzed, lies on the z-axis. If it was not the case, there would be additional delays that are not taken into account here.

The transmission map $T_\phi(\theta)$ is defined as the normalized detected intensity:

$$T_\varphi(\theta) = \frac{|\vec{f}_\varphi(\theta)|^2}{\max[|\vec{f}_\varphi(\theta)|^2]}.$$

In the following the $\theta$-dependence of the transmission, map is discussed. A star is not a point source but has some non-negligible finite size. For example, the angular diameter of our sun, seen from a distance of 10 parsec, is of the order of 5 nrad. To detect an exoplanet, a high rejection ratio for $\theta=0$ is needed in addition to but also for angular separations $\theta$ of a few nrad. The flatter the transmission map around q=0, the easier it will be to reach this "extended" rejection ratio. That is why a transmission map proportional to $\theta^4$ or, even better, to $\theta^6$ is preferred.

In previous work (J. Spronck, S. F. Pereira and J. J. M. Braat, "Chromatism compensation in wide-band nulling interferometry for exoplanet detection," Appl. Opt., (2005)) it was shown that, in order to have a $\theta^4$-transmission map, in addition to the nulling condition in (Equation 11), the following relation is satisfied:

$$\sum_j A_j \sin 2\alpha_j L_j \theta \cos(\varphi - \delta_j) = 0 \quad \text{(Equation 17)}$$

Since this condition is fulfilled for all angles j, Eq. (14) can be split into two different conditions $$\sum_j A_j \sin 2\alpha_j L_j \cos \delta_j = 0 \quad \text{(Equation 18)}$$

$$\sum_j A_j \sin 2\alpha_j L_j \sin \delta_j = 0 \quad \text{(Equation 19)}$$

These conditions are different from the $\theta^4$-conditions for other types of nulling interferometers. However, in the case of a three-telescope configuration, the only configuration that can fulfill these conditions is linear, as it is the case for other nulling interferometers. For exoplanet detection, a linear configuration is however not very interesting because it only gives information in one direction.

Another difficulty in directly detecting an Earthlike exoplanet can be a possible emission from exo-zodiacal dust near the orbital plane of the planet, as in our own solar system. A priori one can assume that it is centro-symmetric. Because of this central symmetry, this problem could be handled by using modulation techniques. A possible solution is to use external modulation, which consists in rotating the whole telescope array around its center, but this gives rise to very slow modulation and it will considerably decrease the number of targets that one can observe during a space mission. A more convenient solution is internal modulation. With this technique, the positions of the telescopes are not changed. Via optical means, different transmission maps are created that are combined in order to create modulation maps.

By changing the angle $\alpha_j$, the "weight" of the amplitude $A_j$ is changed. Thus, the ratio between the amplitudes of the different beams can be changed by simply rotating the waveplates, provided that the nulling condition in (Equation 11) is satisfied. This has two consequences. The first consequence is that, with this type of nulling interferometer, no extra amplitude-matching devices are needed, as it is the case in most of current nulling interferometers. The amplitude matching is inherent to the design and is simply produced by a rotation of the waveplate. The second and much more important consequence is that, since the ratio between the amplitudes of the beams can be changed, a continuous set of transmission maps can be obtained, which could be used for fast modulation.

Figure 6:
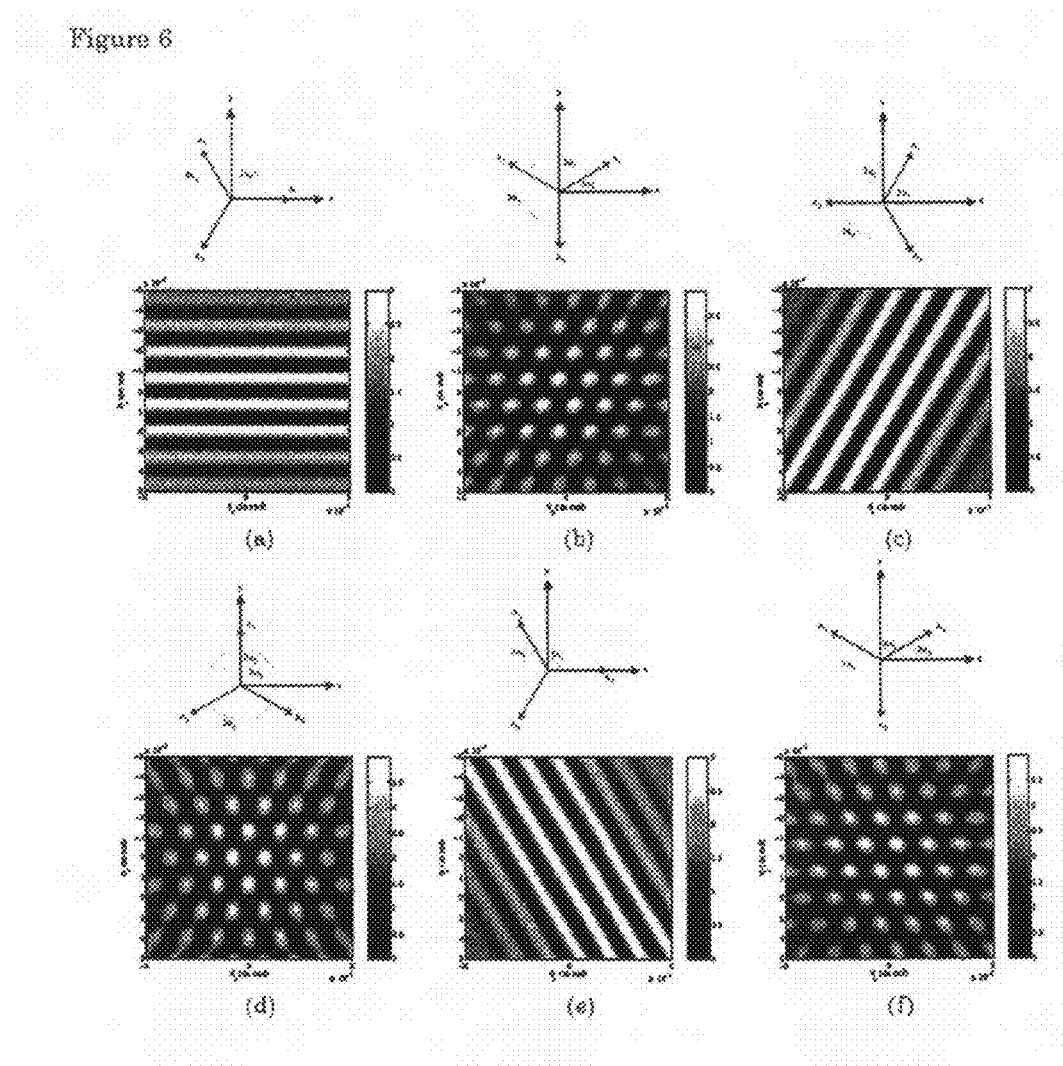
FIG. 6 shows a plurality of three-telescope transmission maps corresponding to different waveplate orientations.

FIG. 6 shows an example of a set of six transmission maps in the three-telescope case that have been obtained by only rotating the waveplates. In these transmission maps, the maximal intensity has been normalized to a value given by $$\sum_j |A_j \sin 2\alpha_j|^2$$

All these maps have been calculated with the following parameters: A1=A2=A3, L1=L2=L3=25 m and d1=0, d2=2π/3, d3=4π/3, and for a spectral band going from 500 to 650 nm. (a) 2a1=0, 2a2=2π/3, 2a3=4π/3, (b) 2a1=π/6, 2a2=π/6+2π/3, 2a3=π/6+4π/3, (c) 2a1=2π/6, 2a2=2π/6+2π/3, 2a3=2π/6+4π/3, (d) 2a1=3π/6, 2a2=3π/6+2π/3, 2a3=3π/6+4π/3, (e) 2a1=4π/6, 2a2=4π/6+2π/3, 2a3=4π/6+4π/3, (f) 2a1=5π/6, 2a2=5π/6+2π/3, 2a3=5π/6+4π/3

Note that this is just an example, out of a continuous range of transmission maps. Three different transmission maps are enough (for example, FIG. (5) (a), (c) and (e) or (b), (d) and (f)), since it can be shown that any transmission map out of the continuous set can be seen as a linear combination of these three transmission maps In some applications, besides the detection of an Earthlike exoplanet, spectral information of the light coming from the planet is needed in order to study its atmosphere. In this case, a wide spectral band is required.

For perfect polarizers and exactly identical waveplates, no factors are present in the nulling condition in (Equation 11) that limit the spectral band, so a high rejection ratio in an infinitely wide spectral band is not unthinkable. However, in practice, this is not true since polarizers and waveplates are not perfect and are spectrally limited. Furthermore, as will be elaborated further hereinbelow, the response of the interferometer is not the same for all wavelengths, that is, the detected intensity is wavelength-dependent.

If identical waveplates are present for each beam, the detected intensity will be proportional to $$I \propto |T_r - T_\alpha|^2 \quad \text{(Equation 20)}$$

independently of the optical path length differences between the beams. The intensity for the constructive interference is then also proportional to Eq. (16), which, in the case of a perfect wave plate is proportional to $$I \propto |1 - \exp(i\Delta\varphi)|^2 = 4\sin^2\frac{\Delta\varphi}{2}. \quad \text{(Equation 21)}$$

where Δφ is the phase difference between the two states of polarization induced by the wave-plate. Furthermore considering conventional waveplates (as opposed to achromatic wave-plates), the following relation is satisfied:

$$\Delta\varphi = \frac{2\pi}{\lambda}(n_e(\lambda) - n_0(\lambda))d = \frac{2\pi}{\lambda}B(\lambda) \quad \text{(Equation 22)}$$

where λ is the wavelength, $n_e(\lambda)$ and $n_o(\lambda)$ are the extraordinary and ordinary refractive indices, d is the thickness and B(λ) is the birefringence of the waveplate.

The intensity is then maximum for Δφ=(2n+1)π (half-wave plate) and equal to zero for Δφ=2n π, where n is an integer. This shows that some wavelengths will be well transmitted, while others will not be transmitted at all.

One criterion to define an acceptable spectral band is then that all the wavelengths are transmitted with at least half the maximal intensity, which leads to the following condition $$(4n+1)\frac{\pi}{2} \le \Delta\varphi = \frac{2\pi}{\lambda}B(\lambda) \le (4n+3)\frac{\pi}{2}. \quad \text{(Equation 23)}$$

Figure 7:
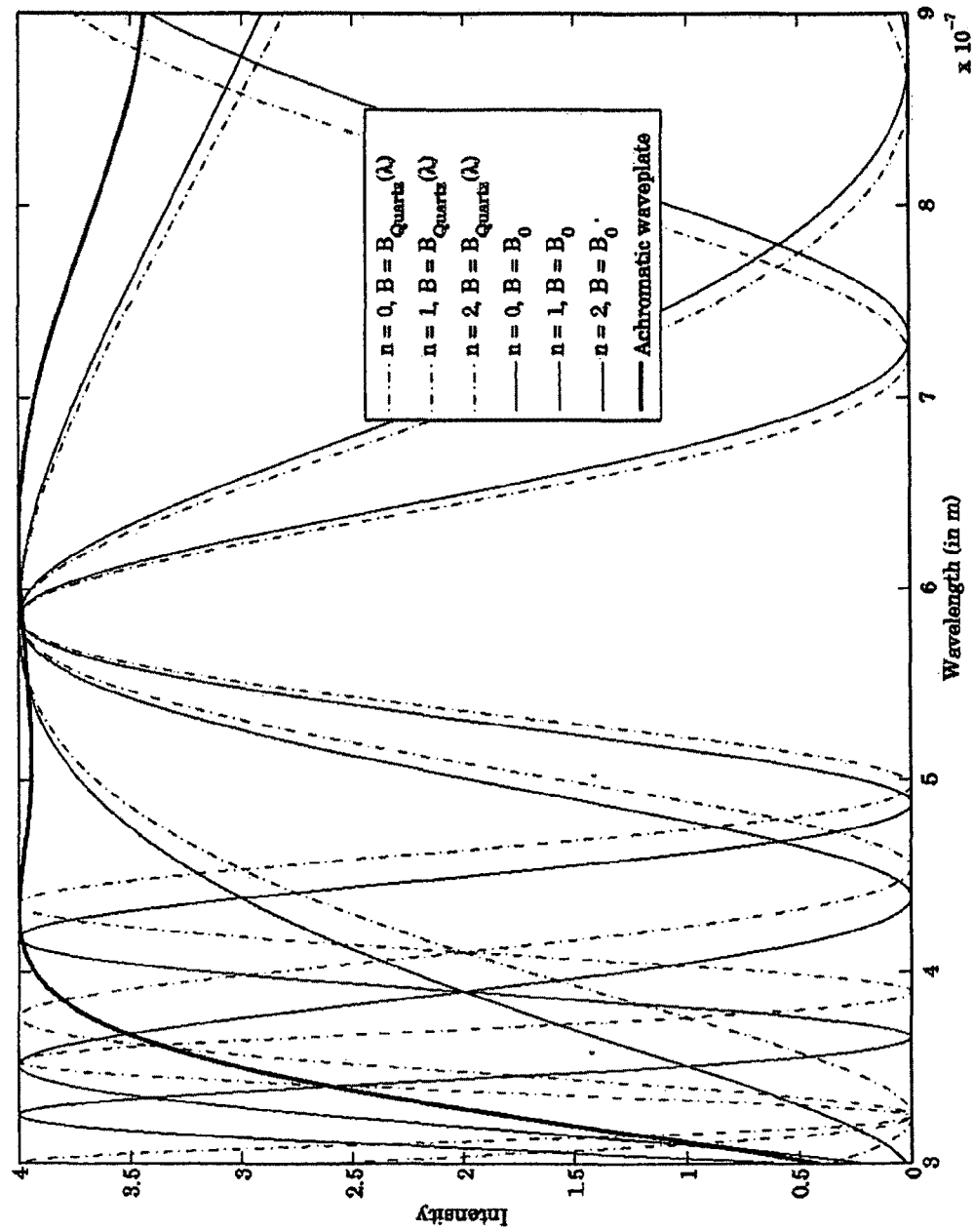
FIG. 7 shows a spectral response a nulling interferometer according to the invention, using various types of waveplates.

Here it is assumed that the birefringence is constant in the spectral band, which, especially in the example of quartz, does not drastically affect the criterion (see FIG. 7). Furthermore, the birefringence is chosen in such a way that the waveplate is a half-wave plate for the wavelength λ. The following relation is then satisfied:

$$B = (2n+1)\frac{\lambda_0}{2} \quad \text{(Equation 24)}$$

The minimal and maximal wavelengths in the acceptable spectral band are then given by $$\lambda_{min} = \frac{(4n+2)}{4n+3}\lambda_0 \text{ and } \lambda_{max} = \frac{(4n+2)}{4n+1}\lambda_0. \quad \text{(Equation 25)}$$

A bandwidth is qualified by defining $$M = \frac{\lambda_{max}}{\lambda_{min}} = \frac{(4n+3)}{4n+1} \quad \text{(Equation 26)}$$

It is seen that the bandwidth is maximum if zero-order waveplates (n=0) are used amounting to M=3. For example, in the infrared region, this technique would allow working in 6 to 18 μm. The spectral band will then probably be limited by the polarizers. Obviously, the acceptable spectral band can be wider if achromatic waveplates (see FIG. 7) are used. In FIG. 7 a spectral response is shown in the case of quartz waveplates (dash-dot lines) and constant birefringence waveplates (solid lines). Also zeroth-order, first-order and second-order waveplates are compared. The solid line represents the spectral response in the case of an achromatic waveplate made of quartz and magnesium fluoride.

While the invention has been described with reference to the exemplary embodiments, these only serve for illustrative purposes and the invention is not limited thereto, but encompasses variations and modifications which are in reach of the skilled person practicing the invention. Such modifications could amount to more then three beam telescope configurations, or other polarization varying structures, possibly, with use of predetermined rotation variation structures utilizing mirrors. These and other modifications are deemed to fall within the scope of the invention, as claimed in the annexed claims.

The invention claimed is:

1. An optical system for providing on-axis destructive interference of light received from an object along a predetermined system optical axis, comprising:
    a receiving and guiding optical structure for receiving and guiding at least three beams of light received from said object, the receiving and guiding optical structure arranged to provide a relative optical path difference between the at least three beams;
    a combining optical structure for combining the at least three beams; and
    a polarization varying optical structure arranged between the receiving and guiding optical structure and the combining optical structure, and constructed for varying a polarization state of the at least three beams relative to each other to have a mutually different polarization state in order to provide on-axis destructive interference.

2. The optical system according to claim 1, wherein the polarization varying optical structure comprises, for each received light beam, identical polarization variation elements.

3. The optical system according to claim 2, wherein a pre-polarizing filter structure is provided to provide a predetermined polarization to the beams prior to varying the polarization state of the beams in the polarization varying optical structure.

4. The optical system according to claim 3, wherein the pre-polarizing filter structure is a linear filter structure providing a linear polarization.

5. The optical system according to claim 3, wherein the pre-polarizing filter structure comprises a polarizing beam splitter.

6. The optical system according to claim 4, wherein the pre-polarizing filter structure comprises a polarizing beam splitter.

7. The optical system according to claim 1, wherein a pre-polarizing filter structure is provided to provide a predetermined polarization to the beams prior to varying the polarization state of the beams in the polarization varying optical structure.

8. The optical system according to claim 7, wherein the pre-polarizing filter structure is a linear filter structure providing a linear polarization.

9. The optical system according to claim 8, wherein the pre-polarizing filter structure comprises a polarizing beam splitter.

10. The optical system according to claim 7, wherein the pre-polarizing filter structure comprises a polarizing beam splitter.

11. The optical system according to claim 1, wherein the polarization varying optical structure comprises, for each received light beam, a waveplate or a pupil rotator, for varying the polarization state of the received light beam.

12. The optical system according to claim 11, wherein an optical axis of each of the waveplates is arranged transverse to a propagation direction of the light and wherein the optical axis of the respective waveplates are arranged having a predetermined angle relative to each other.

13. The optical system according to claim 12, wherein the angles between the optical axes are equal.

14. The optical system according to claim 11, wherein the waveplate is an achromatic waveplate.

15. The optical system according to claim 1, wherein the polarization varying optical structure is arranged to provide modulation.

16. The optical system according to claim 15, wherein the modulation is provided by combining a weighted combination of the at least three beams having a varied polarization state.

17. The optical system according to claim 16 wherein the weight of the at least three beams is provided by changing the orientation of the polarization rotation optical structure relative to a post-polarizing filter structure.

18. The optical system according to claim 1, wherein a post-polarizing filter structure is provided to provide polarization filtering of the combined at least three beams having a varied polarization state.

19. A method of providing on-axis destructive interference of light received from an object along a predetermined system optical axis, comprising:
    receiving and guiding at least three beams of light received from said object;
    providing a relative optical path difference between the at least three beams;
    varying a polarization state of the at least three beams relative to each other to have a mutually different polarization state; and
    combining the at least three beams in order to provide on-axis destructive interference.

* * * * *